Figure 1:
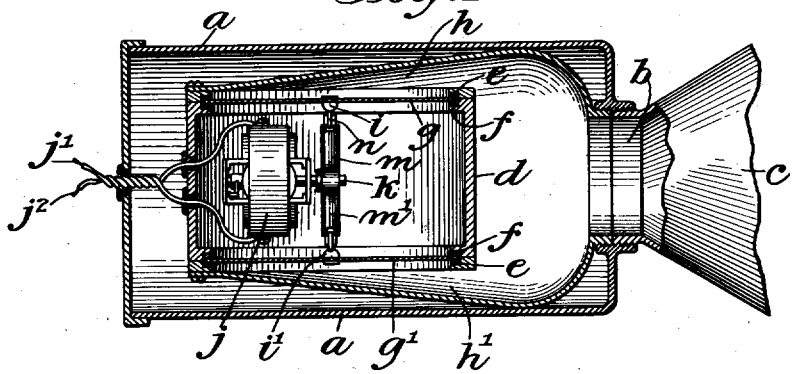

O. C. ARLITZ.

MECHANICAL HORN.

APPLICATION FILED DEC. 19, 1912.

Reissued May 4, 1915. 13,909.

WITNESSES

Chas. F. Clagett

E. M. Finbank

INVENTOR

Oscar C. Arlitz

BY

G. C. Dean ATTORNEY

UNITED STATES PATENT OFFICE.

OSCAR C. ARLITZ, OF GRANTWOOD, NEW JERSEY, ASSIGNOR, BY MESNE ASSIGNMENTS, TO LOVELL-McCONNELL MANUFACTURING COMPANY, A CORPORATION OF DELAWARE.

MECHANICAL HORN.

13,909. Specification of Reissued Letters Patent. Reissued May 4, 1915.

Original No. 979,245, dated December 20, 1910, Serial No. 564,907. Application for reissue filed December 19, 1912. Serial No. 738,111.

*To all whom it may concern:*

Be it known that I, OSCAR C. ARLITZ, a citizen of the United States, residing at Grantwood, in the county of Bergen and State of New Jersey, have invented certain new and useful Improvements in Mechanical Horns, of which the following is a specification, reference being had therein to the accompanying drawings, which form a part thereof.

My invention relates to mechanical horns and more particularly to a type thereof employing a mechanically flexed diaphragm.

The main object of the invention is to provide a horn of this character which will develop sound waves in volume sufficiently great to adapt the device for signal purposes in connection with boats, marine protection stations or in fact any and all connections where sound waves of high frequency are required for the purpose of penetrating to substantial distances.

A still further object is to provide a device of this character employing a plurality of diaphragms actuated synthetically and projecting the sound waves through an amplifier common to both diaphragms without absorbing any substantial quantity of the sound waves.

A still further object is to provide a device employing a plurality of diaphragms which may be operated by a simple and compact mechanism common to both of said diaphragms, thus insuring uniformity in the actions of the diaphragms.

A still further object is to so construct and arrange the diaphragms and the mechanism actuating same as to permit the free unobstructed vibration of both diaphragms irrespective of the position of the actuating mechanism relative thereto.

A still further object is to provide a horn of this character employing a plurality of oppositely disposed parallel diaphragms and a rotary hammer, the axis of which is perpendicular to the axis of said diaphragms, thus causing said hammer to impact with both diaphragms simultaneously to develop sound waves by simultaneous flexure of both diaphragms, wherein the said hammer is so constructed as to recede with the diaphragm in case of a loss of synthetic operation between either of the diaphragms and the hammer.

A still further object is to provide in a horn of this character employing a diaphragm and a rotary hammer, the axes of said hammer and diaphragm being perpendicular to each other, wherein the impact head of the hammer is capable of movement axially of the diaphragm thus causing the centrifugal force developed by the rotation of said hammer to aid in the restoration of the impact head to normal after it has been caused to recede with the diaphragm.

A still further object is to provide a horn of the character immediately above specified, wherein the centrifugal force will be supplemented by means tending to normally project the impact head of the hammer to its full operative position.

A still further object is to provide in a horn of this character a hammer impact member which is capable of receding with the diaphragm upon the reflex action thereof in case of a loss of the synthetic operation of these parts, said impact member being so constructed and arranged as to not recede under the force of the impact in flexing the diaphragm. And a still further object is to provide a horn of this character the construction and design of which will be such as to permit of its production at a low cost.

The invention consists primarily in a mechanical horn embodying therein a plurality of parallel diaphragms, a rotary impact member arranged between, and adapted to impact with and vibrate both of, said diaphragms, the axis of said impact member being perpendicular to the axes of said diaphragms, a casing having a chamber upon the outside of each said diaphragm and a sound outlet common to both of said chambers, and an amplifier communicating with said sound outlet; and in such other novel features of construction and combination of parts as are hereinafter set forth and described, and more particularly pointed out in the claims hereto appended.

Figure 2:
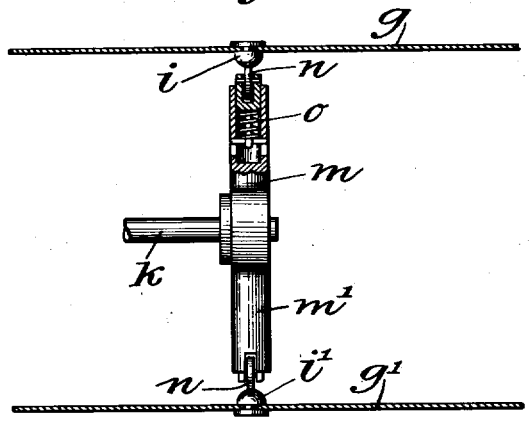
Figure 3:
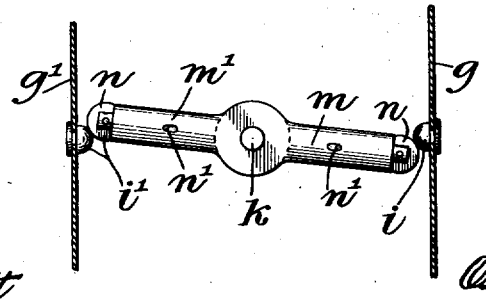

Referring to the drawings:—Figure 1 is a horizontal section through the diaphragm box, the amplifier or horn being shown in elevation; Fig. 2 is a detailed view on a larger scale of the hammer mechanism and the impact portions of the diaphragms, and, Fig. 3 is an end view of the mechanism shown in Fig. 2.

Like letters refer to like parts throughout the several views.

In the embodiment of my invention shown in the drawings, I have shown at *a* the outer casing of the horn having at the front thereof, the sound outlet opening *b*, in communication with which is the amplifier or horn proper *c*. Mounted within the casing *a* is a drum *d* carrying the rings *e f*, or other means securing the edges of the flexible diaphragms *g g'* in relation to said drum. The sole function of this drum is to support the diaphragms, and the motor actuating the hammer, although if desired, in the interests of compactness of structure, said motor may be mounted within the casing *a* exteriorly of said drum, said drum being provided with suitable bearings for the shaft of said motor. This manner of mounting a diaphragm affords an inert body of air of fixed volume rearwardly of each diaphragm thus limiting the projection of the sound waves to a direction forwardly of said diaphragms. Within the casing *a* and inclosing the ends of the drum *d*, are casings forming the branch chambers *h h'* containing the air column, against which the diaphragms *g g'* act, these chambers converging toward the sound opening *b* so as to combine and project the sound waves through said opening into the amplifier *c*. It will be observed that by this arrangement the conditions forwardly of each diaphragm are the same, and that the combined sound waves of both of said diaphragms are concentrated and delivered through the said sound opening *b*, the construction and arrangement of the walls forming the branch chambers *h h'* tending to amplify the sound waves before their escape through the said opening. The branch chambers *h h'*, of the chamber within the casing *a*, containing the column of air against which the diaphragms act, afford a construction wherein the combined action of the two diaphragms is on substantially the same column of air which when said diaphragms are vibrated, will result in an increased volume of sound waves of substantially the same frequency and duration and will avoid interference with either diaphragm from the other.

Each diaphragm *g g'* carries a wear plate or impact member *i i'* centrally thereof, said impact member being of small dimensions to insure the maximum vibrations of the diaphragm from the engagement of the impact member of the hammer therewith.

Mounted within the casing *a*, or within the drum *d*, as desired, is an ordinary electric motor *j*, the terminal wires $j'$ $j^2$ of which extend through the said drum and the casing *a* to a battery or other source of power not shown. While an electric motor is the preferred source of power, owing to its being constantly in readiness for use, any other desired source of power may be employed.

Carried by the motor shaft *k* are a plurality of radially extending hammer arms *m m'*, preferably two in number, said arms, owing to the fact that the axis of said shaft *k* is perpendicular to the axes of the diaphragms *g g'*, extending into close juxtaposition to the impact members *i i'* on the said diaphragms.

To insure the highest efficiency it is essential to provide clearance for the free vibration of the diaphragms *g g'* as interference with such vibrations from the hammer mechanism would lead to a loss in volume of the sound waves resulting from the flexure of the diaphragms by the actuation of the power mechanism. Inasmuch as it is necessary in order to flex the diaphragms, for the development of the sound waves, that the impact member should project to a point beyond the normal plane of the impact members *i i'*, it will readily be understood that, owing to the high frequency of the vibrations of said diaphragm, it will be practically impossible to synchronize the movement of the hammer mechanism with such vibrations. Hence it becomes necessary to so construct and arrange the hammer heads that while normally projecting beyond the normal plane of said impact members so as to secure the desired flexure of the diaphragms, with the operation thereof, said hammer heads, if engaged by the diaphragm upon the reflex action thereof, will recede from their normal position with the diaphragm, and thus avoid any material interference with the vibrations of the diaphragms or the frequency and duration of the sound waves resulting therefrom. To accomplish this result, I preferably use the arms *m m'* bifurcated at the ends and form slots in the fork thus formed, to accommodate the trunnions *n'* on the hammer heads *n*, thus permitting the reciprocation of said hammer heads and at the same time permitting the rotation thereof under the force of the impact in a manner to minimize wear on said head. Said heads *n* are preferably in the form of disks thus facilitating the rolling contact above referred to and at the same time securing a cam-like action upon the diaphragm. While the weight of the hammer heads and the rapid rotation of the arms *m m'* will, through centrifugal force, tend to project these heads toward the diaphragms to the full extent permitted by the slots in which the arbors *n'* move, I have found that this force unaided, will not restore these heads to normal after they have been pushed radially toward the shaft *k* by either diaphragm, rapidly enough to secure the uninterrupted, successive flexures of the diaphragm. To obviate this difficulty, I form in each arm *m m'* below the head *n* a spring seat in which is mounted a light spring *o* tending to normally project its head $n$ into a position where it will engage the impact members $i\ i'$.

In operating the device it is merely necessary to close the circuit through the terminals $j'\ j^2$ causing the motor $j$ to rapidly rotate the shaft $k$ and the arms $m\ m'$ carrying the hammer heads $n$. As these arms rotate, the said heads, passing the normal plane of the impact members $i\ i'$, simultaneously flex both diaphragms $g\ g'$ to substantially the same extent, thus setting up vibrations in both diaphragms and developing sound waves forwardly of each, and within the branch chambers $h\ h'$. Such vibrations will correspond in frequency and duration uniting within the casing $a$ adjacent to the sound opening $b$ through which they pass to the amplifier $c$. The motor and the hammer mechanism not being within the column of air influenced by the vibrations or flexure of said diaphragms, the sound waves are not modified or affected in any way by the actuation of this mechanism or the vibrations incidental thereto. The axis of the shaft $k$, being perpendicular to the axes of the diaphragms $g\ g'$, and the arms $m\ m'$, when flexing the diaphragm, being in substantial alinement with the axes of said diaphragms, it becomes apparent that the diaphragms will be under all conditions simultaneously flexed, although by a wiping action which will develop side pressure upon the arbors $n'$ of the hammer heads $n$ to an extent to avoid such reactions upon said heads as to cause them to recede against the tension of their springs $o$. If, however, in addition to the side pressure above referred to, there is a pressure exerted substantially radially of the shaft $k$, upon the heads $n$ by either diaphragm $g\ g'$ upon its reflex action, this pressure, acting directly against the said springs, will cause the hammer heads to recede with the diaphragm, the springs $o$ restoring them to their normal position immediately so that before the completion of the half revolution between the impacts the heads will be restored to their operative position.

The arrangement of the diametrically opposite arms simultaneously contacting with the parallel diaphragms, will with an ordinary motor running at from twelve to eighteen hundred revolutions per minute, impart double this number of vibrations to the diaphragm by a direct impact, thus increasing both the frequency and volume of the sound waves developed over the use of a single diaphragm and a single impact member. The result is sound waves of high frequency and high powers of penetration coupled with large volume which in conjunction with an ordinary amplifier adapts the device to various uses as signals.

The long leverage at which the hammer heads $n$ act, furthermore insures a sufficiently sharp impact to insure the rapid flexure of the diaphragm and vibrations of high frequency, thus increasing the volume of the sound waves developed with the consumption of a given quantity of power, in addition to that increase in the volume of sound waves incidental to the multiplication of diaphragms and the simultaneous flexure of same.

I am aware that it is old to develop sound waves by the mechanical vibration of a diaphragm, and I do not intend to claim such broadly. I believe, however, it is broadly new to combine a plurality of diaphragms with a hammer mechanism simultaneously flexing both diaphragms which diaphragms act upon the same column of air and I intend to claim such broadly.

It is not my intention to limit the invention to the precise details of construction shown in the accompanying drawings, it being apparent that such may be modified without departing from the spirit and scope of the invention.

Having described the invention, what I claim as new, and desire to have protected by Letters Patent, is:—

1. A mechanical horn embodying therein a plurality of parallel diaphragms, a rotary impact member arranged between, and adapted to vibrate both of, said diaphragms, a casing having a chamber upon the outside of each said diaphragm and a sound outlet common to both of said chambers, and an amplifier communicating with the said sound outlet.

2. A mechanical horn embodying therein a drum the ends of which are inclosed by a plurality of parallel diaphragms, whereby an inert column of air is formed between said diaphragms, a rotary impact member, arranged between, and adapted to vibrate both of, said diaphragms, a casing having a chamber upon the outside of each said diaphragm and a sound outlet common to both of said chambers, and an amplifier communicating with the said sound outlet.

3. A mechanical horn embodying therein a plurality of parallel diaphragms, a rotary impact member arranged between, and adapted to vibrate both of, said diaphragms, a casing having a sound outlet, a large chamber adjacent to said outlet and branch chambers extending from said last mentioned chamber forwardly of each of said diaphragms whereby a single column of air is formed which is simultaneously displaced by both of said diaphragms, and said sound waves will be collected and simultaneously discharged through said sound outlet, and an amplifier communicating with the said sound outlet.

4. A mechanical horn embodying therein a plurality of parallel diaphragms, a rotary impact member arranged between, and adapted to vibrate both of, said diaphragms, said impact member comprising a rotary stem and a hammer head capable of movement relative to said stem and normally projecting beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with the said sound outlet.

5. A mechanical horn embodying therein a plurality of parallel diaphragms, a rotary impact member arranged between, and adapted to vibrate both of, said diaphragms, said impact member comprising a plurality of rotary stems each said stem carrying a hammer head capable of movement relative to said stem, and normally projecting beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with the said sound outlet.

6. A mechanical horn embodying therein a plurality of parallel diaphragms, a plurality of oppositely disposed, simultaneously rotatable impact members, arranged between and adapted to simultaneously engage and vibrate both of, said diaphragms, a casing having a chamber upon the outside of each said diaphragm and a sound outlet common to both of said chambers, and an amplifier communicating with the said sound outlet.

7. A mechanical horn embodying therein a plurality of parallel diaphragms, a rotary impact member arranged between, and adapted to vibrate both of, said diaphragms, said impact member comprising a pair of oppositely disposed, radially projected stems and a hammer head on each stem capable of movement relative to said stem and normally projecting beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with the said sound outlet.

8. A mechanical horn embodying therein a plurality of parallel diaphragms, a rotary impact member arranged between, and adapted to vibrate both of, said diaphragms, said impact member comprising a rotary stem and a hammer head capable of movement relative to said stem and a spring acting on said head to normally project it beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with the said sound outlet.

9. A mechanical horn embodying therein a plurality of parallel diaphragms, a rotary impact member arranged between, and adapted to vibrate both of, said diaphragms, said impact member comprising a rotary stem and a hammer head rotatably mounted in and capable of movement relative to said stem and a spring acting on said head to normally project it beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with the said sound outlet.

10. A mechanical horn embodying therein a plurality of parallel diaphragms, a plurality of oppositely disposed, simultaneously rotatable impact members arranged between and adapted to simultaneously engage and vibrate both of said diaphragms, the axis of rotation of said impact members being perpendicular to the axes of said diaphragms, a casing having a chamber upon the outside of each said diaphragm, and a sound outlet common to both of said chambers and an amplifier communicating with said sound outlet.

11. A mechanical horn embodying therein a plurality of parallel diaphragms, a rotary impact member arranged between, and adapted to vibrate both of said diaphragms, said impact member comprising a shaft, the axis of which is perpendicular to the axes of said diaphragms, a pair of oppositely disposed, radially projected stems and a hammer head carried by, and capable of movement relative to, each of said stems, and normally projecting beyond the planes of said diaphragms whereby said head is adapted to recede with either of said diaphragms upon an engagement of these parts upon the reflex action of the latter, a casing having a chamber upon the outside of each said diaphragm, and a sound outlet common to both of said chambers, and an amplifier communicating with said sound outlet.

12. A mechanical horn embodying therein a plurality of parallel diaphragms, a rotary impact member arranged between, and adapted to vibrate both of said diaphragms, said impact member comprising a rotary stem the axis of which is at right angles to the axes of said diaphragms, a hammer head capable of movement relative to said stem, and a spring acting on said head to normally project it beyond the planes of said diaphragms, whereby said head is adapted to recede with either of said diaphragms upon an engagement of these parts upon the reflex action of the latter, a casing having a chamber upon the outside of each of said diaphragms and a sound outlet common to both of said chambers, and an amplifier communicating with said sound outlet.

13. A mechanical horn embodying therein a plurality of parallel diaphragms, a rotary impact member arranged between, and adapted to vibrate both of said diaphragms, said impact member comprising a rotary stem, the axis of which is perpendicular to the axes of said diaphragms, a disk hammer head rotatably mounted in, and capable of movement relative to, said stem, and a spring acting on said head to normally project it beyond the planes of said diaphragms, whereby said head is adapted to recede with either of said diaphragms upon an engagement of these parts upon the reflex action of the latter, a casing having a chamber upon the outside of each of said diaphragms, and a sound outlet common to both of said chambers, and an amplifier communicating with said sound outlet.

14. In a mechanical horn, the combination with a casing having a sound outlet and interior partitions forming an air column having two branches, communicating with said sound outlet, of a drum the ends of which, adjacent to said branch chambers are inclosed by a plurality of parallel diaphragms whereby an inert column of air is formed between said diaphragms, and said diaphragms when flexed outwardly, act upon substantially the same column of air, raised impact members carried by said diaphragms respectively, a motor mounted within said casing, the shaft of which motor is substantially perpendicular to the axes of said diaphragms and terminates within said drum in substantial alinement with said diaphragms, impact members carried by said diaphragms respectively, a plurality of diametrically opposite. radially projected bifurcated arms carried by said motor shaft, each said arm having mounted in the fork thereof a disk hammer head having trunnions mounted in elongated slots in said arms, whereby said heads are capable of movement relative to said arms, a spring normally projecting said head beyond the normal plane of either of said diaphragms, whereby said heads, by a wiping engagement with said impact members of said diaphragms, will flex said diaphragms, but will be caused to recede with said diaphragms by a substantially radial thrust thereon through the reflex action thereof, and an amplifier communicating with said sound outlet.

15. A mechanical horn embodying therein a diaphragm, and a rotary member adapted to vibrate said diaphragm, said rotary member comprising a rotary body, a plurality of impact heads, each rotatable about its own axis, and a support for each of said impact heads, said supports normally projecting said heads into operative position for engagement with said diaphragm, and having guided movement on said body, whereby said heads may recede with said diaphragm on the engagement of these parts and upon the reflex action of the latter.

16. A mechanical horn embodying therein a diaphragm, and a rotary member adapted to vibrate said diaphragm, said rotary member comprising a rotary body, a plurality of impact heads, each rotatable about its own axis, and a support for each of said impact heads, said supports normally projecting said heads into operative position for engagement with said diaphragm, and having guided radial movement on said body, whereby said heads may recede with said diaphragm on the engagement of these parts upon the reflex action of the latter.

17. A mechanical horn embodying therein a diaphragm, and a rotor having a plurality of impact members carried thereby and adapted to vibrate said diaphragm, said impact members each having guided movement relative to said rotor, and each rotatable about its own axis, and a plurality of springs for projecting said impact members to limiting positions whereby they may have engagement with said diaphragm upon a rotation of said rotor.

18. A mechanical horn embodying therein a diaphragm, and a rotor having a plurality of impact members carried thereby and adapted to vibrate said diaphragm, said impact members each having guided movement relative to said rotor, in a direction having a radial component, and each rotatable about its own axis, and a plurality of springs for projecting said impact members to limiting positions whereby they may have engagement with said diaphragm upon a rotation of said rotor.

Signed at New York city in the county of New York and State of New York this 18th day of December A. D. 1912.

OSCAR C. ARLITZ.

Witnesses:

CLAIR W. FAIRBANK,
FLORENCE SENEN.